US012779949B2

(12) United States Patent
Cremasco et al.

(10) Patent No.: US 12,779,949 B2
(45) Date of Patent: Nov. 3, 2026

(54) VEHICLE HAVING AUXILIARY FAN TO IMPROVE HVAC PERFORMANCE

(71) Applicant: FCA US LLC, Auburn Hills, MI (US)

(72) Inventors: Paolo Cremasco, Windsor (CA); Uday Kiran Mahakali, Novi, MI (US); Sreekanth Surapaneni, Oakland Township, MI (US)

(73) Assignee: FCA US LLC, Auburn Hills, MI (US)

( * ) Notice: Subject to any disclaimer, the term of this patent is extended or adjusted under 35 U.S.C. 154(b) by 209 days.

(21) Appl. No.: 18/500,566

(22) Filed: Nov. 2, 2023

(65) Prior Publication Data

US 2025/0144976 A1 May 8, 2025

(51) Int. Cl.
*B60H 1/32* (2006.01)

(52) U.S. Cl.
CPC ........... *B60H 1/3211* (2013.01); *B60H 1/323* (2013.01); *B60H 2001/3258* (2013.01); *B60H 2001/3266* (2013.01); *B60H 2001/3277* (2013.01)

(58) Field of Classification Search
CPC .................. B60H 1/3211; B60H 1/323; B60H 2001/3258; B60H 2001/3266; B60H 2001/3277
See application file for complete search history.

(56) References Cited

U.S. PATENT DOCUMENTS

| | | | | |
|---|---|---|---|---|
| 12,062,767 | B1 * | 8/2024 | Roy | B60K 1/04 |
| 2010/0191416 | A1 * | 7/2010 | Yamaguchi | B60H 1/00764 701/36 |
| 2014/0069604 | A1 * | 3/2014 | Tamakoshi | B60H 1/00021 165/42 |
| 2016/0301114 | A1 * | 10/2016 | Izumi | H01M 10/625 |

(Continued)

FOREIGN PATENT DOCUMENTS

| | | | | |
|---|---|---|---|---|
| CN | 110159409 A | * | 8/2019 | F01P 7/02 |
| CN | 116632403 A | * | 8/2023 | H01M 10/613 |
| JP | 2001171365 A | * | 6/2001 | |

(Continued)

OTHER PUBLICATIONS

Machine translation of Foreign Reference: CN116632403A—Zhao et al. (Year: 2023).*

(Continued)

*Primary Examiner* — Scott A Browne
*Assistant Examiner* — Rami Nabih Bedewi
(74) *Attorney, Agent, or Firm* — Jeremy J. Klobucar

(57) ABSTRACT

A vehicle including an engine bay and a passenger cabin. The engine bay includes an engine and an HVAC system that is configured to condition the passenger cabin. The HVAC system includes a condenser and a primary fan for drawing ambient air through the condenser; a controller configured to control the HVAC system; at least one sensor in communication with the controller; and at least one auxiliary fan in communication with the controller for drawing air away (Continued)

from the engine bay that has been heated by the engine, wherein based on a signal received from the at least one sensor, the controller is configured to operate the auxiliary fan to draw the air heated by the engine away from the engine bay to minimize the air heated by the engine from intermixing with the ambient air and being circulated through the condenser by the primary fan.

8 Claims, 7 Drawing Sheets

(56) References Cited

U.S. PATENT DOCUMENTS

2019/0001808 A1* 1/2019 Del Gaizo ............... F01P 11/10
2021/0189944 A1* 6/2021 Wolk ......................... F01P 7/04

FOREIGN PATENT DOCUMENTS

JP 3338757 B2 * 2/2006 ............... B60H 1/32
JP 4438757 B2 * 3/2010
JP 2010173519 A * 8/2010

OTHER PUBLICATIONS

Machine translation of Foreign Reference: JP3338757B2—Kojima (Year: 2006).*
Machine Translation of Foreign Reference: JP2001171365A—Kurata et al. (Year: 1999).*
Machine Translation of Foreign Reference: JP2010173519A—Tatsu (Year: 2009).*
Machine Translation of Foreign Reference: CN110159409A—Zhang et al. (Year: 2019).*
Machine Translation of Foreign Reference: JP4438757B2—Kojima (Year: 2006).*

* cited by examiner

VEHICLE HAVING AUXILIARY FAN TO IMPROVE HVAC PERFORMANCE

FIELD

The present disclosure relates to a vehicle having an auxiliary fan to improve HVAC performance.

BACKGROUND

This section provides background information related to the present disclosure which is not necessarily prior art.

A vehicle heating, ventilation, and air conditioning (HVAC) system generally includes a refrigerant, an evaporator, a condenser, and a compressor. The condenser is a heat exchanger that is used to reject heat from the HVAC system in the vehicle to the outside ambient air. A fan draws air through the condenser to facilitate heat transfer between the condenser and the outside ambient air. In general, colder ambient air being drawn to the condenser is better for heat exchange, and permits the HVAC system to operate more effectively and efficiently. For example, the compressor may operate at a reduced capacity when colder ambient air is being drawn through the condenser. When the vehicle is not moving, however, the heat generated during operation of an engine of the vehicle can heat the air surrounding the engine, which can then be drawn by the fan through the condenser. When the air heated by the engine passes through the condenser, a lower amount of heat exchange occurs between the condenser and the ambient air, which can negatively affect the performance and efficiency of the HVAC system.

SUMMARY

This section provides a general summary of the disclosure, and is not a comprehensive disclosure of its full scope or all of its features.

According to a first aspect of the present disclosure, there is provided a vehicle including an engine bay and a passenger cabin, the engine bay including an engine and a heating, ventilating, and air conditioning (HVAC) system that is configured to condition the passenger cabin, the HVAC system including a condenser and a primary fan for drawing ambient air through the condenser; a controller configured to control the HVAC system; at least one sensor in communication with the controller; and at least one auxiliary fan in communication with the controller for drawing air away from the engine bay that has been heated by the engine, wherein based on a signal received from the at least one sensor, the controller is configured to operate the auxiliary fan to draw the air heated by the engine away from the engine bay to minimize the air heated by the engine from intermixing with the ambient air and being circulated through the condenser by the primary fan.

According to the first aspect, the at least one sensor includes a velocity sensor that generates signals indicative of a velocity of the vehicle, and if the velocity sensor generates a signal indicative of the velocity being below a predetermined value, the controller is configured to operate the at least one auxiliary fan.

According to the first aspect, the predetermined value is 10 miles per hour (mph).

According to the first aspect, the at least one sensor includes a temperature sensor that generates signals indicative of a temperature of the air heated by the engine, and if the temperature sensor generates a signal indicative of the temperature being above a predetermined value, the controller is configured to operate the at least one auxiliary fan.

According to the first aspect, the predetermined value is 35 degrees C.

According to the first aspect, the at least one auxiliary fan is located proximate the engine bay.

According to the first aspect, a plurality of the auxiliary fans may be located proximate the engine bay.

According to the first aspect, a belly pan may be located proximate the engine bay, and the at least one auxiliary fan is attached to the belly pan.

According to a second aspect of the present disclosure, there is provided a method for operating a vehicle heating, ventilation, and air conditioning (HVAC) system located in a vehicle engine bay having an engine, wherein the HVAC system includes a condenser, a primary fan for drawing air through the condenser, and at least one an auxiliary fan. The method may include determining whether the HVAC system is operating in a cooling mode; determining whether the vehicle is traveling at a velocity below a predetermined value; after determining whether the vehicle is traveling at the velocity below the predetermined value, determining whether a temperature of air in the engine bay is above a predetermined threshold; and after determining that the temperature of the air in the engine bay is above the predetermined threshold, operating the at least one auxiliary fan to draw the air in the engine above at the temperature above the predetermined threshold away from the engine bay and away from the primary fan.

According to the second aspect, the determining whether the vehicle is traveling at the velocity below the predetermined value is determined by a controller in communication with a velocity sensor that generates signals indicative of a velocity of the vehicle.

According to the second aspect, the predetermined value is 10 miles per hour (mph).

According to the second aspect, the determining whether the temperature of the air in the engine bay is above the predetermined threshold is determined by a controller in communication with a temperature sensor that generates signals indicative of a temperature of the air heated by the engine.

According to the second aspect, the predetermined threshold is 35 degrees C.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. The example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Figure 1:
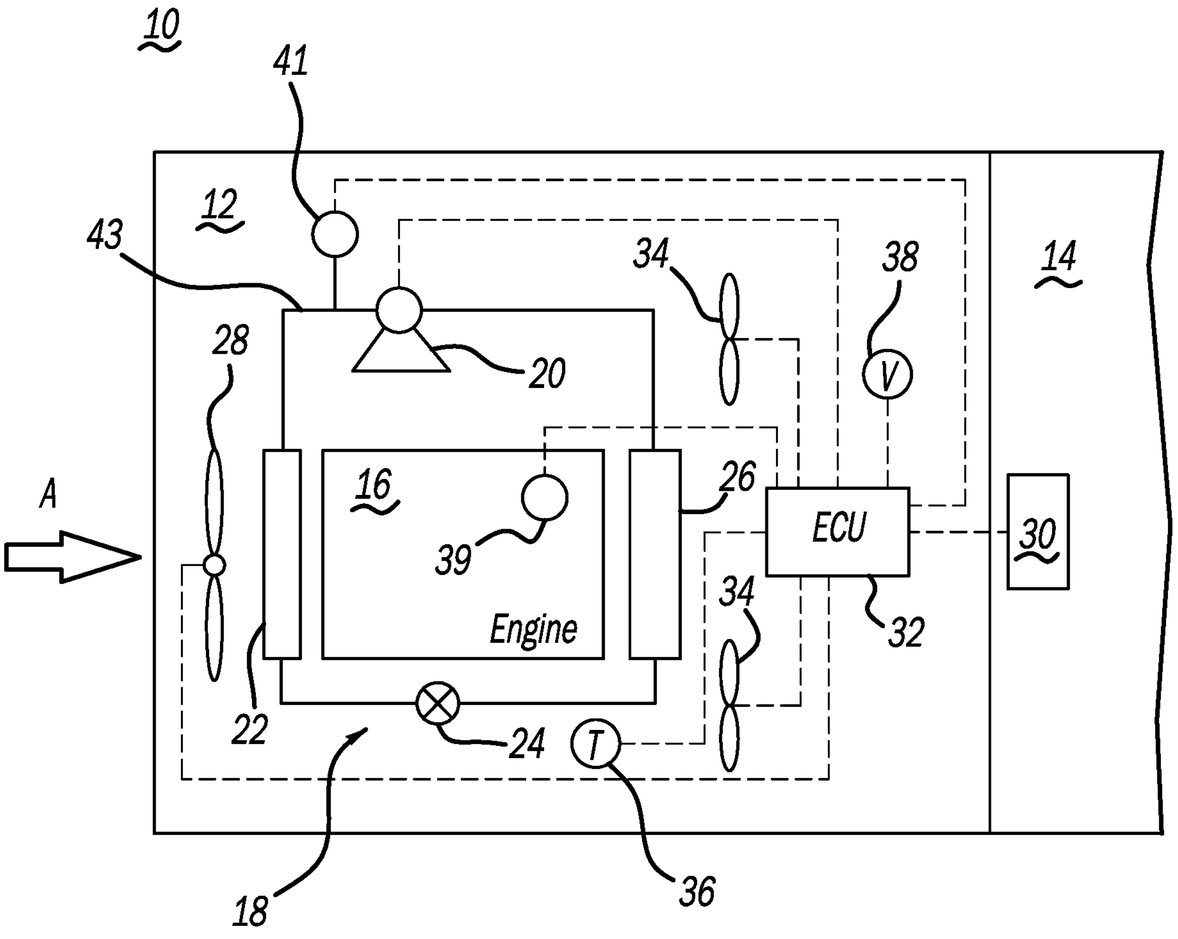
FIG. 1 is a schematic illustration of a vehicle having an HVAC system according to a principle of the present disclosure.

FIG. 1 illustrates a vehicle 10 having an engine bay 12 and a passenger cabin 14. Engine bay 12 includes an engine 16, which may be an internal combustion engine, an electric engine, or a hybrid engine, and an HVAC system 18 for providing heating, ventilation air conditioning (HVAC) to passenger cabin 14.

HVAC system 18 includes a compressor 20, a condenser 22, an expansion valve 24, an evaporator 26, and a primary fan 28 for directing ambient air A through condenser 22 to facilitate heat exchange between a refrigerant of HVAC system 18 and the ambient air A. While condenser 22 is illustrated as being between primary fan 28 and engine 16, it should be understood that primary fan 28 may be positioned between condenser 22 and engine 16, if desired. In addition, HVAC system 18 includes a blower 30 for blowing the conditioned air throughout passenger cabin 14. A controller 32, which in the illustrated embodiment may be an electronic control unit (ECU) of vehicle 10, may be in communication with and configured to control compressor 20, primary fan 28, and blower 30. Alternatively, a separate controller (not shown) may be used for control of HVAC system 18. Expansion valve 24 may be a capillary tube or an electrically operated valve. If expansion valve 24 is an electrically operated valve, controller 32 may also be in communication with expansion valve 24 to control operation thereof during use of HVAC system 18.

As is known in the art, during operation of HVAC system 18, a refrigerant is compressed by compressor 20 such that the refrigerant exits the compressor 20 as a high-temperature and high-pressure gas. The gaseous refrigerant travels from compressor 20 to condenser 22, where the gaseous refrigerant begins to condense and exchange heat with the ambient air surrounding the condenser 22. To assist with the heat exchange process, primary fan 28 may be operated to increase the volume of air passing through the condenser 22 and increase the amount of heat that can be exchanged between the refrigerant passing through the condenser 22 and the ambient air A.

After exiting the condenser 22, the condensed refrigerant will pass through expansion valve 24 to expand the refrigerant before it passes through evaporator 26. While in evaporator 26, the refrigerant will again exchange (i.e., absorb) heat from the surrounding environment before again re-entering compressor 20 and repeating the process. As the air of the environment surrounding evaporator 26 is cooled, blower 30 can draw and disperse the cooled air into passenger cabin 14. The refrigerant, after exchanging heat with the surrounding environment, then exits evaporator 26 and travels to compressor 20 to repeat the process.

As noted above, primary fan 28 may be operated during use of HVAC system 18 to increase the volume of air passing through the condenser 22 and increase the amount of heat that can be exchanged between the refrigerant passing through the condenser and the ambient air A. Primary fan 28 may not necessarily be operated when vehicle 10 is in motion because the motion of vehicle 10 may tend to cause the ambient air A to pass through condenser 22 without any needed assistance. Accordingly, operation of primary fan 28 is typically conducted when low air flow conditions exist. For example, when vehicle 10 is either not in motion or moving at a low velocity (e.g., less than 10 mph).

Figure 2:
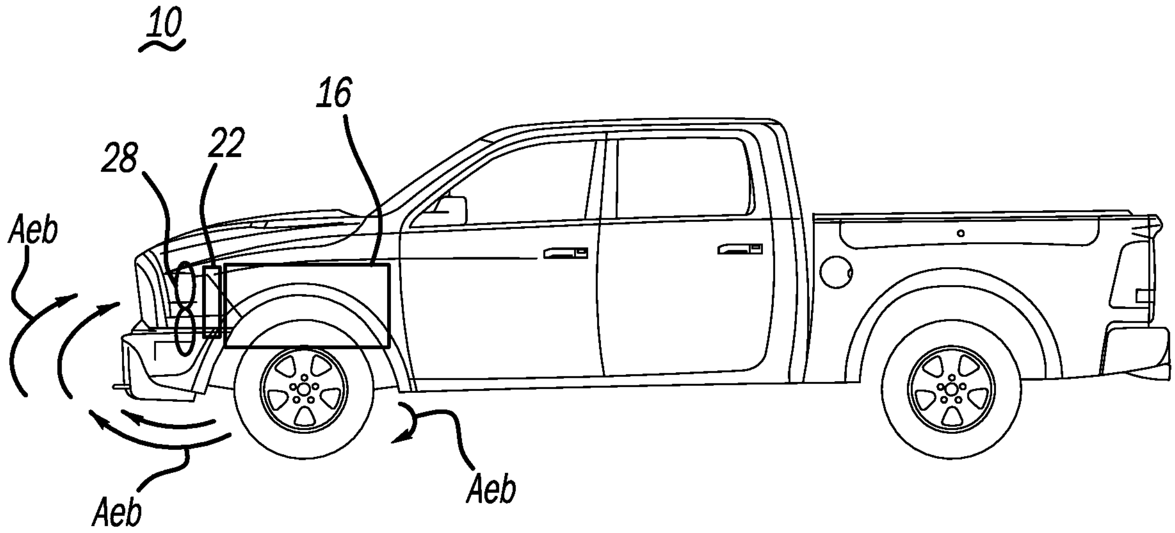
FIG. 2 illustrates a flow of air from a vehicle engine bay in a vehicle that is not equipped with the HVAC system according to the present disclosure.

During operation of vehicle 10, engine 16 produces heat that can warm the air located in the engine bay 12. Even though primary fan 28 may be operating to draw air toward the condenser 22 from outside vehicle 10, it should be understood that at least a portion of the air $A_{eb}$ located in engine bay 12 that has been warmed by engine 16 can be drawn by primary fan 28 toward condenser 22, as shown in FIG. 2. In order to prevent or at least substantially minimize the air $A_{eb}$ warmed by engine 16 in engine bay 12 from being drawn by primary fan 28 toward condenser 22, HVAC system 18 may include one or more auxiliary fans 34 located within or proximate engine bay 12 to circulate the air warmed by engine 16 away from engine bay 12. By drawing and blowing the air $A_{eb}$ away from engine bay 12, the air $A_{eb}$ warmed by engine 16 is prevented or at least substantially minimized from being recirculated by primary fan 28 back toward condenser 22. In this manner, the air A reaching condenser 22 is cooler, which increases the effectiveness and efficiency of HVAC system 18.

Auxiliary fan(s) 34 are in communication with and configured to be controlled by controller 32. In this manner, auxiliary fan(s) 34 may only be operated by controller 32 when controller 32 determines that operation of auxiliary fan(s) 34 is necessary. The use of auxiliary fan(s) 34 may be necessary when vehicle 10 is not in motion (i.e., stopped), or when vehicle 10 is moving at a low velocity (e.g., less than 10 mph). To determine whether operation of auxiliary fan(s) 34 is necessary, controller 32 may be in communication with at least one of a temperature sensor 36 located in engine bay 12 that is configured to generate signals indicative of temperature in engine bay 12 and a velocity sensor 38 that generates signals indicative of a velocity of vehicle 10. Temperature sensor 36 may be located proximate condenser 22 to generate signals indicative of a temperature of the air passing through condenser 22. Velocity sensor 38 is configured to generate a signal indicative of the velocity of vehicle 10, and can be a sensor that determines a position of a gas pedal (not shown) of vehicle 10, a sensor that determines a rotation amount of a wheel (not shown) of vehicle 10, or any other sensor that can determine the velocity of vehicle 10. Operation of HVAC system 18 by controller 32 in conjunction with temperature sensor 36 and/or velocity sensor 38 will be described in more detail later.

While controller 32 is described above as being in communication with at least one of a temperature sensor 36 and a velocity sensor 38 to determine whether to operate auxiliary fan(s) 34, it should be understood that vehicle 10 includes a plurality of additional sensors that can be used to determine whether to operate auxiliary fan(s) 34. For example, vehicle 10 may include a sensor 39 that may be in communication with controller 32 that generate signals indicative of engine coolant temperature, power electronics temperature, high-voltage battery temperature (if vehicle 10 is an electrically-powered vehicle), low voltage battery temperature, engine combustion air temperature, transmission oil temperature, engine oil temperature, electric motor temperature (if vehicle 10 is an electrically- or hybrid-powered vehicle), and under-hood temperature can be used. In this regard, each of the above-described components will be affected by higher temperatures and auxiliary fan(s) 34 can be used to move the high-temperature air Aeb away from these components.

Moreover, the operation of auxiliary fan(s) 34 may be controlled based on signals indicative of either compressor refrigerant discharge pressure or compressor refrigerant discharge temperature. In this regard, as shown in FIG. 1, a sensor 41 may be in communication with a discharge line 43 positioned between compressor 20 and condenser 22 and in communication with controller 32 that can generate signals indicative of either compressor refrigerant discharge pressure or compressor refrigerant discharge temperature. If sensor 41 generates a signal indicative of compressor refrigerant discharge pressure that is greater than 300 psi, controller 32 may operate auxiliary fan(s) 34. Similarly, if sensor 41 is a temperature sensor, controller 32 may operate auxiliary fans if sensor 41 generates a signal indicative of the compressor refrigerant discharge temperature being greater than 110 degrees C.

Figure 3:
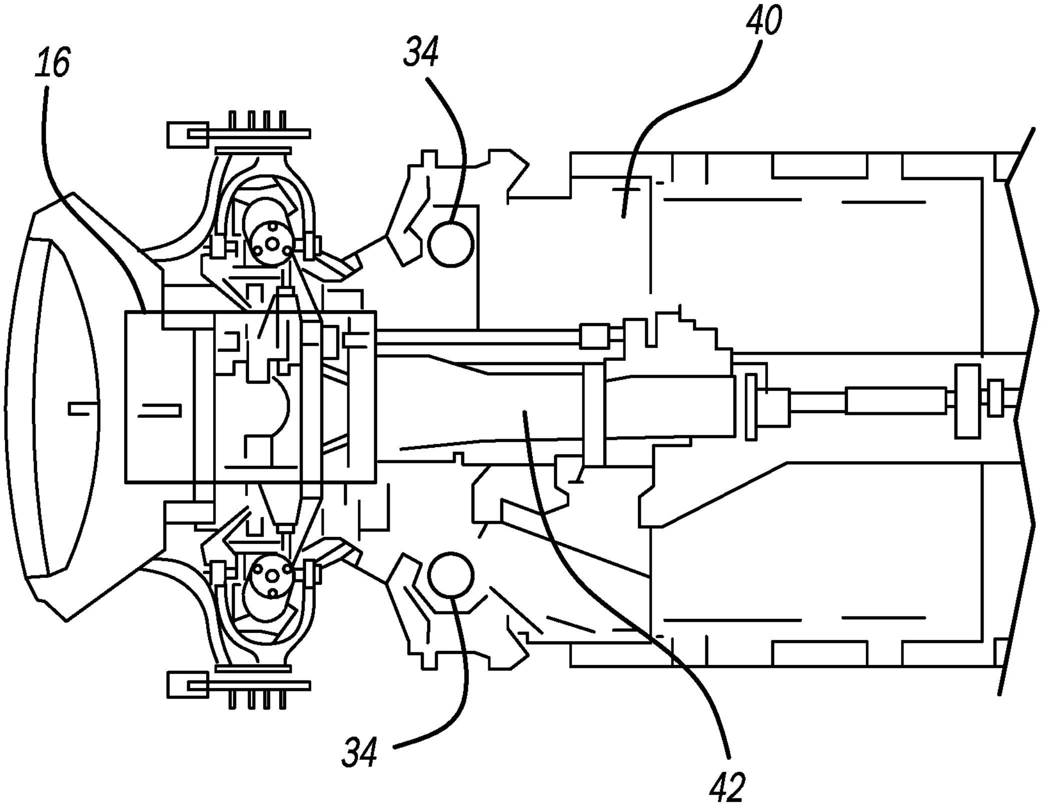
FIG. 3 is a top perspective view of a vehicle belly pan with auxiliary fans according to the present disclosure attached thereto.

Now referring to FIG. 3, example locations of the auxiliary fan(s) 34 are illustrated. FIG. 3 is a top view of a belly pan 40 of vehicle 10, with engine 16 only shown schematically for purposes of illustration. As can be seen in FIG. 3, the auxiliary fan(s) 34 are located laterally outward and rearwardly from engine 16 and may be attached to belly pan 40. It should be understood that auxiliary fan(s) 34 in FIG. 3 are facing downward (i.e., toward the ground beneath vehicle 10) such that the air $A_{eb}$ in engine bay 12 can be drawn away from engine bay 12 and away from belly pan 40. While auxiliary fan(s) 34 are located proximate an outer perimeter of belly pan 40, it should also be understood that auxiliary fan(s) 34 may be located nearer to a powertrain component without departing from the scope of the present disclosure. In this regard, auxiliary fan(s) 34 may be located at any location proximate engine bay 12 where auxiliary fan(s) 34 are able to draw the air $A_{eb}$ from engine bay 12 and minimize the air $A_{eb}$ from being recirculated to condenser 22 by primary fan 28.

In addition, while auxiliary fan(s) 34 are illustrated as being attached to belly pan 40, it should be understood that auxiliary fan(s) 34 may be attached to other structures of vehicle 10 if desired. For example, auxiliary fan(s) 34 may be attached to a frame (not shown) of vehicle 10, a support bracket (not shown) that supports auxiliary fan(s) 34 relative to engine 16, or in any other manner determined by one skilled in the art.

Figure 4:
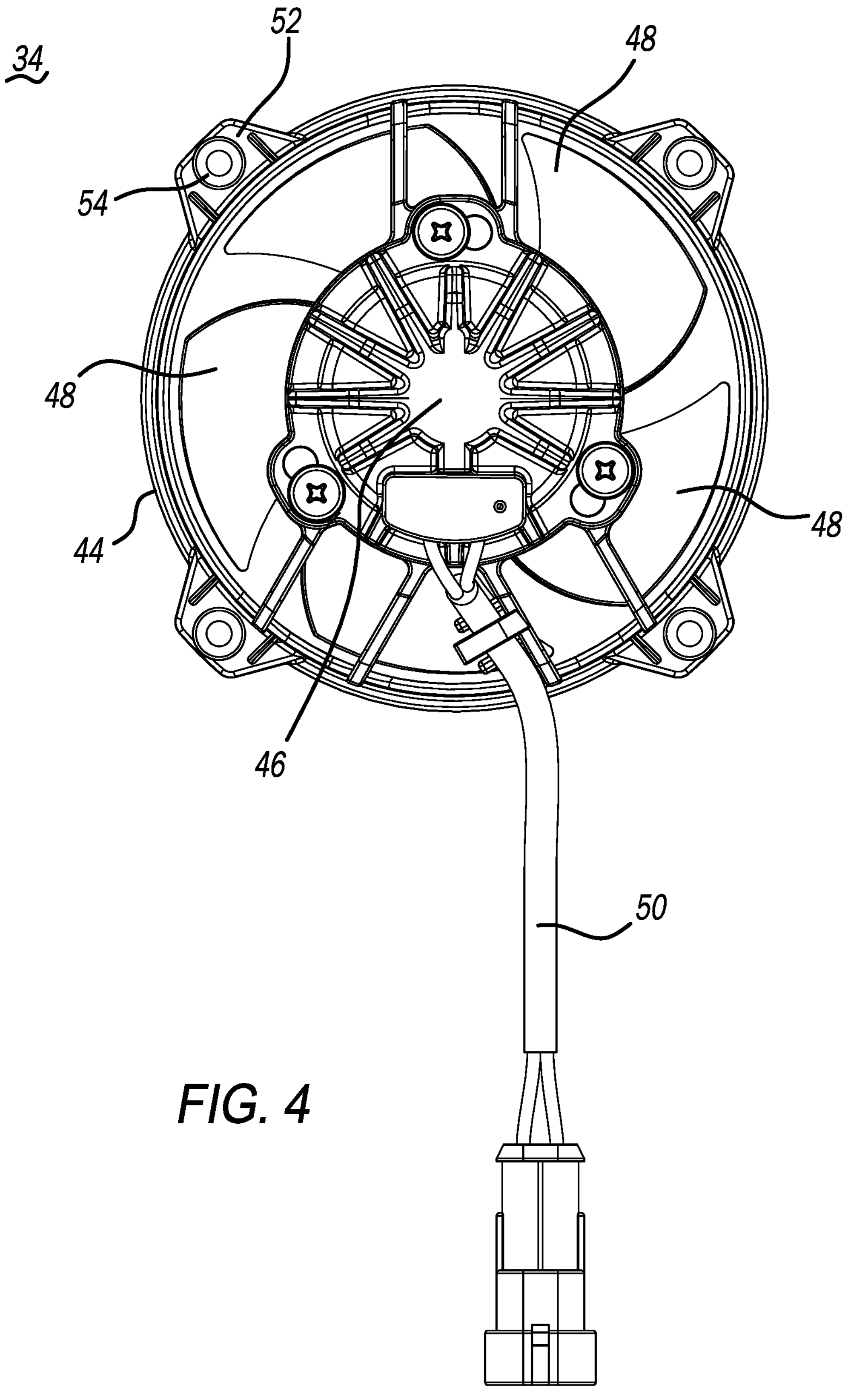
FIGS. 4-6 illustrate an example auxiliary fan that can be used in the HVAC system illustrated in FIG. 1.
Figure 5:
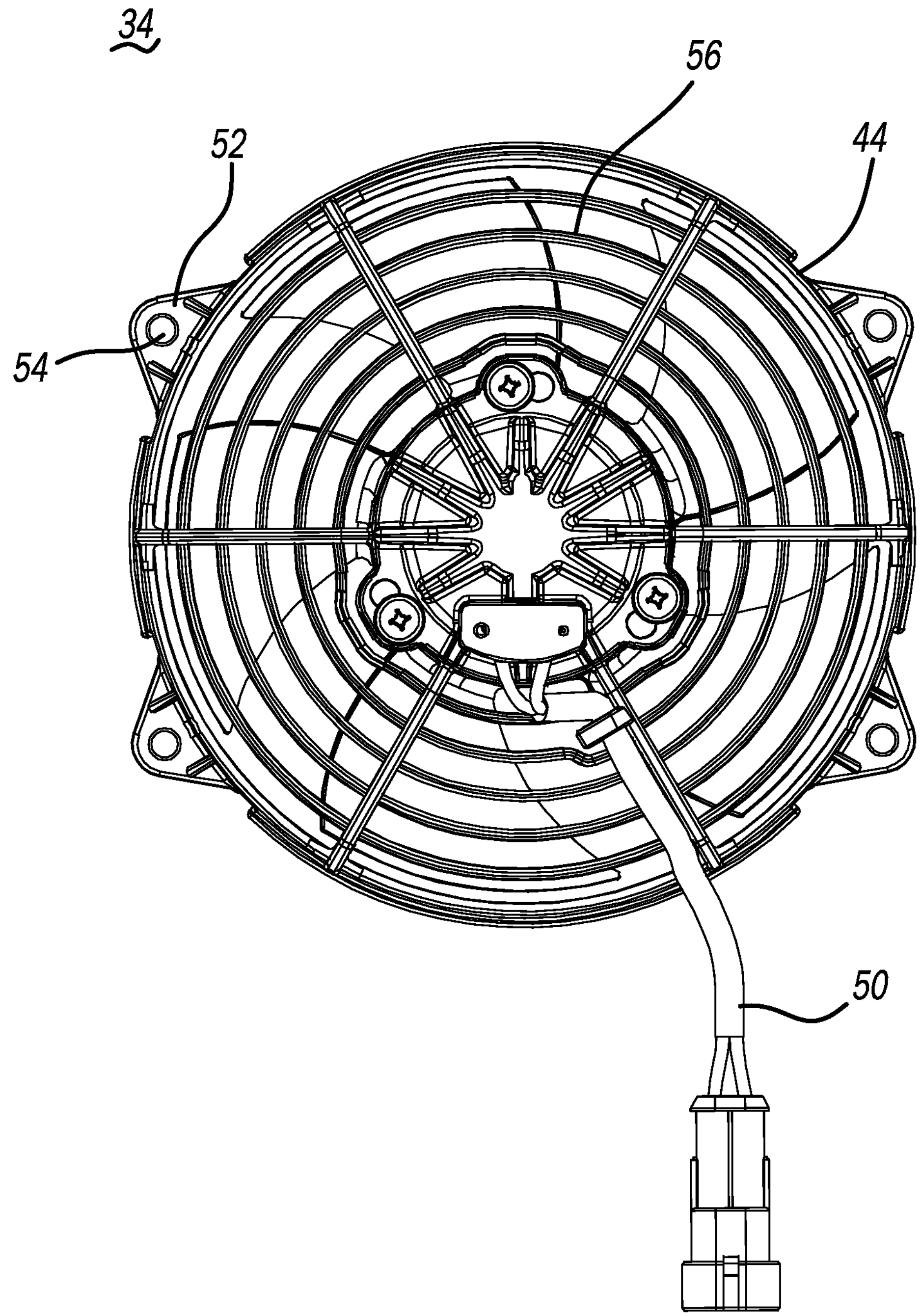
Figure 6:
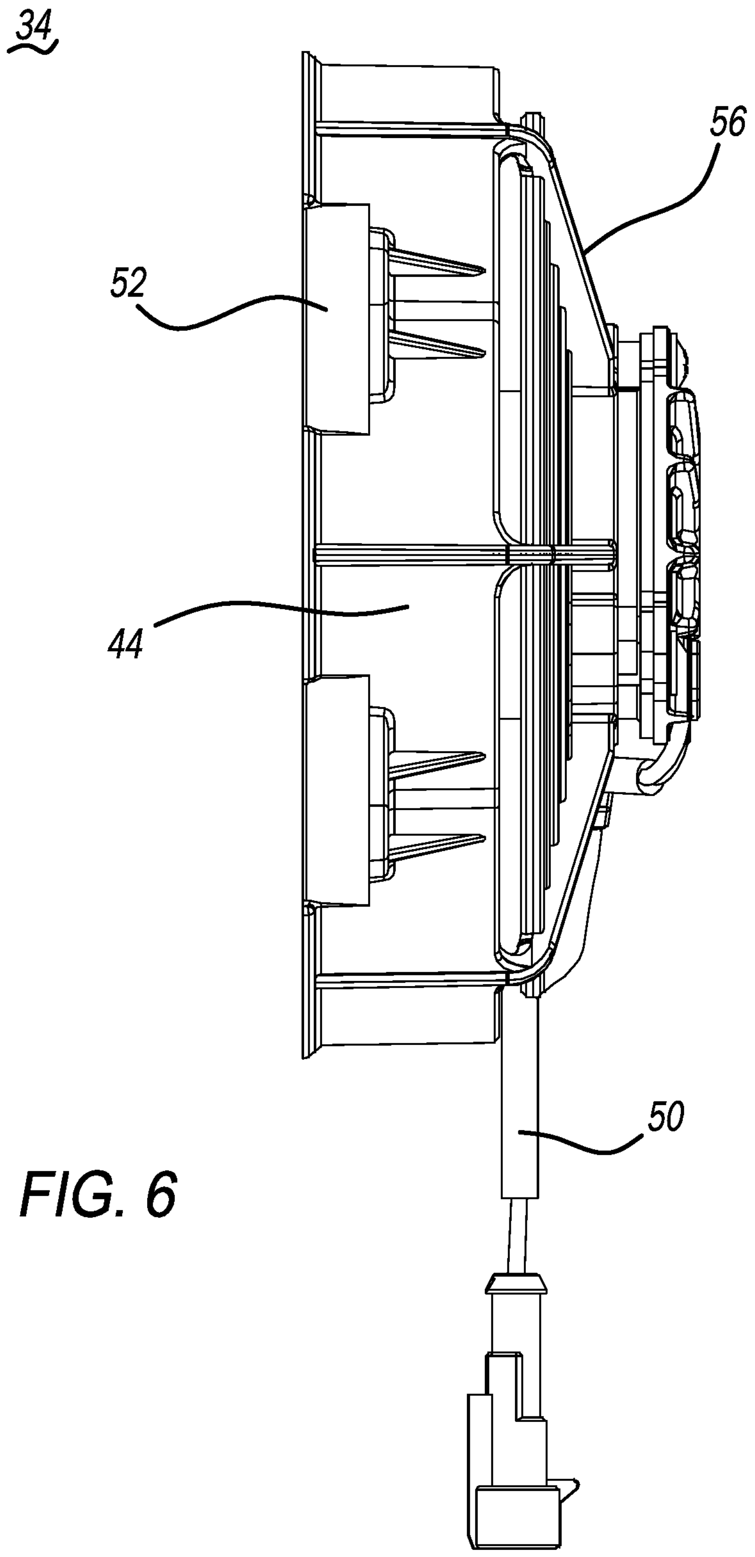

Now referring to FIGS. 4 to 6, an example auxiliary fan 34 is illustrated. Auxiliary fan 34 may include a housing 44, an electric motor 46 for rotating a plurality of blades 48 of auxiliary fan 34, and a cable 50 for providing electric power to electric motor 46. Housing 44 may include a plurality of outwardly extending lobes 52 that each define an aperture 54 configured for receipt of a fastener (not shown) that can secure auxiliary fan 34 to, for example, belly pan 40. In addition, auxiliary fan 34 may include a cage 56 that protects blades 48 during rotation thereof. The example auxiliary fan 34 illustrated in FIGS. 4-6 has a diameter that ranges between four to seven inches in length. As one skilled in the art would readily acknowledge and appreciate, an auxiliary fan 34 having a larger diameter can draw and move a greater volume of the air $A_{eb}$ from engine bay 12. One skilled in the art will also acknowledge and appreciate, however, that various packaging restraints will exist in vehicle 10. Thus, the size of auxiliary fan 34 selected for use in vehicle 10 can be determined by the amount of air $A_{eb}$ desired to be moved in combination with the amount of packaging space available proximate engine bay 12 to locate and mount auxiliary fan 34.

Figure 7:
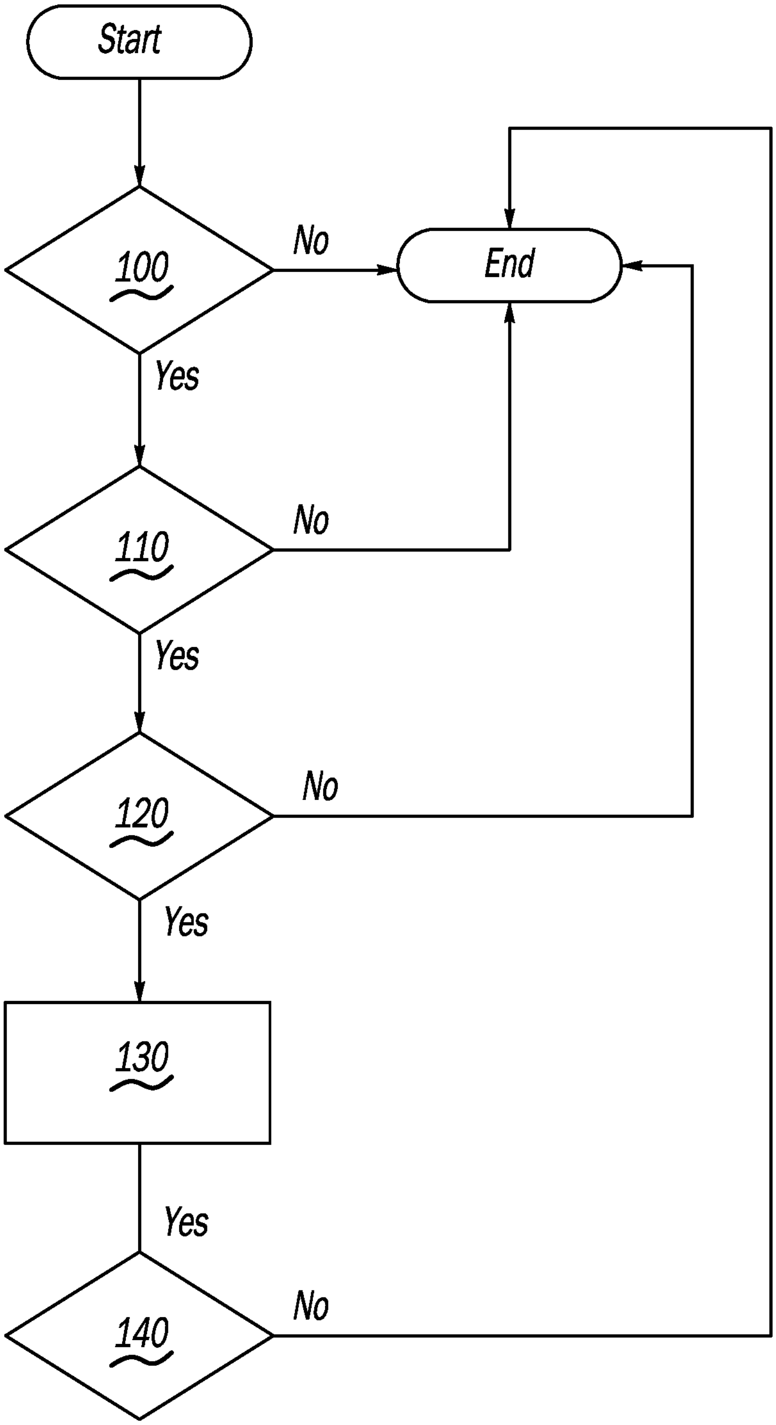
FIG. 7 is a flow chart depicting a method of using the HVAC system illustrated in FIG. 1.

Now referring to FIG. 7, a method of operating HVAC system 18 including one or more of the auxiliary fans 34 will be described. In step 100, it is determined whether HVAC system 18 is operating in a cooling mode where condenser 22 is used to exchange heat between the refrigerant and the air A. If HVAC system 18 is operating in a cooling mode, the method proceeds to step 110 to determine whether the vehicle 10 is stopped or moving at a low velocity. If the HVAC system 18 is not operating in a cooling mode, the method may end because operation of auxiliary fan(s) 34 may be unnecessary.

In step 110, controller 32 is configured to communicate with velocity sensor 38 to determine the velocity of vehicle 10. If the velocity of vehicle 10 is less than a predetermined value (e.g., 10 mph), the method may proceed to step 120. If vehicle 10 is moving at a velocity greater than 10 mph, the method may end because the velocity of vehicle 10 may be such that the air $A_{eb}$ is pushed away from engine bay 12 and away from primary fan 28 due to the motion of vehicle 10.

In step 120, controller 32 may communicate with temperature sensor 36 to determine whether the temperature of the air $A_{eb}$ in engine bay 12 is above a predetermined value (e.g., 35 degrees C.). Put another way, controller 32 may communicate with temperature sensor 36 to determine whether the temperature of the air $A_{eb}$ in engine bay 12 would negatively affect operation of condenser 22. If temperature sensor 36 generates a signal indicative of a temperature above the predetermined value, the method may proceed to step 130. If temperature sensor 36 generates a signal indicative of a temperature below the predetermined value, the method may end because the temperature of the air $A_{eb}$ in engine bay 12 may not negatively affect operation of HVAC system 18.

At step 130, after it has been determined that vehicle 10 is moving slowly or stopped and the temperature of the air Aeb in engine bay 12 is above the predetermined value (e.g., 35 degrees C.), controller 32 is configured to operate auxiliary fan(s) 34 to move the air $A_{eb}$ away from engine bay 12 and away from primary fan 28. After beginning operation of auxiliary fan(s) 34, controller 32 may continue to communicate with temperature sensor 36 and velocity sensor 38 to determine whether continued operation of auxiliary fan(s) 34 is necessary (step 140). If it is determined that operation of auxiliary fan(s) 34 remains necessary, auxiliary fan(s) 34 may continue to operate. If it is determined that operation of auxiliary fan(s) 34 is not necessary (i.e., vehicle 10 is no longer stopped or moving slowly, or temperature $A_{eb}$ has fallen below the predetermined value, controller 32 can instruct auxiliary fan(s) 34 to cease operation where the method ends. In any event, once auxiliary fan(s) 34 are instructed to operate, controller 32 may continue operation of the auxiliary fan(s) 34 for a predetermined amount of time (e.g., 2 minutes) regardless whether vehicle 10 has increased velocity or the temperature in engine bay 12 has decreased.

Figure 8:
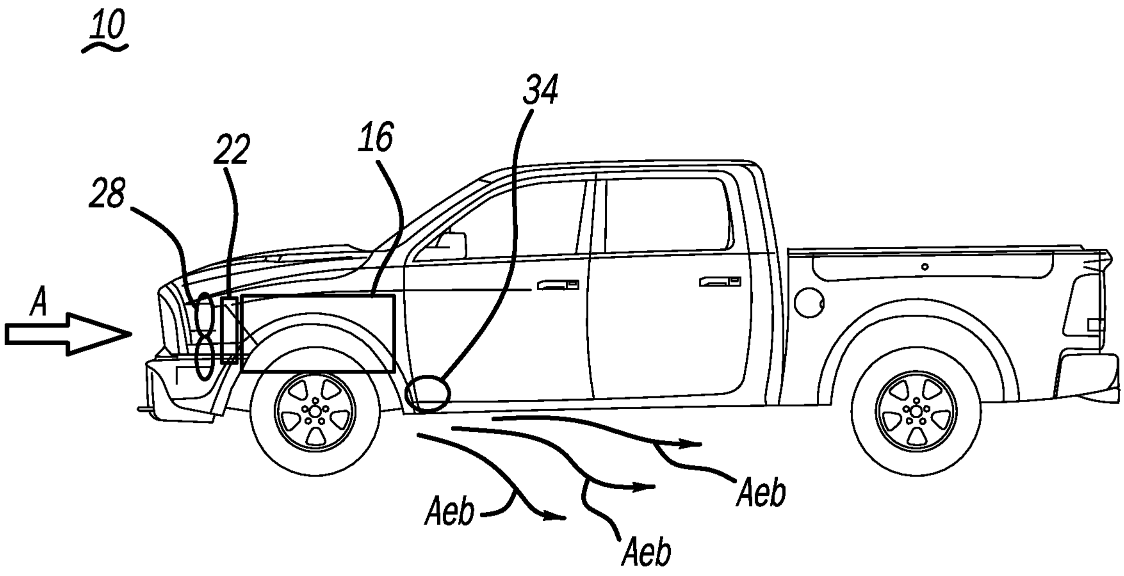
FIG. 8 illustrates a flow of air from a vehicle engine bay in a vehicle that is equipped with the HVAC system illustrated in FIG. 1.

By moving the air $A_{eb}$ away from engine bay 12 using auxiliary fan(s) 34, the air $A_{eb}$ that is warmed by engine 16 is prevented or at least substantially minimized from being recirculated through condenser 22 by primary fan 28 as shown in FIG. 8. In this manner, the ambient air A, which has a temperature less than the air $A_{eb}$ warmed by the engine 16, is the only air, or at least a majority of the air, that reaches condenser 22 for heat exchange with the refrigerant passing through condenser 22. Thus, a greater amount of heat exchange with the refrigerant in condenser 22 may occur, which increases the productivity and efficiency of HVAC system 18. In addition, various components such as compressor 20 do not need to operate at an increased capacity to account for the increased temperature air $A_{eb}$ being recirculated through condenser 22, which can decrease the amount of electric power required by compressor 20 during operation of HVAC system 18. As a result, the useful life of compressor 20 and other components of HVAC system 18 can be increased.

It should be understood that while operation of auxiliary fan(s) 34 has been described above relative to use of a temperature sensor 36 located in engine bay 12, the present disclosure should not be limited thereto. Indeed, vehicle 10 may include an ambient air temperature sensor (not shown) that is not located in the engine bay 12. If the ambient air temperature sensor generates a signal indicative of a high ambient air temperature (e.g., 35 degrees C.), controller 32 can activate auxiliary fan(s) 34 and a signal generated by temperature sensor 36 located in engine bay 12 would not be needed because the ambient air temperature is already at a temperature sufficient to trigger activation of auxiliary fan(s) 34.

Put another way, if the temperature of the ambient air is already at an elevated level, the temperature in the engine bay 12 will in all likelihood be greater than the ambient air temperature such that it would not be necessary to obtain a signal from the temperature sensor 36. Thus, the above-described method may include an intermediate step between step 110 and step 120 where controller 32 communicates with the ambient air sensor to determine whether the ambient air temperature is elevated to an extent where auxiliary fan(s) 34 should be activated. If the ambient air sensor generates a signal indicative of elevated ambient air temperature (e.g., 35 degrees C.), controller 32 can activate auxiliary fan(s) 34. Conversely, if the ambient air sensor does not generate a signal indicative of elevated ambient air temperature, the method may proceed to step 120.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle comprising:

an engine bay and a passenger cabin, the engine bay including an engine and a heating, ventilating, and air conditioning (HVAC) system that is configured to condition the passenger cabin, the HVAC system including a condenser and a primary fan positioned forward of the engine and the condenser for drawing ambient air through the condenser;

a controller configured to control the HVAC system;

at least one sensor in communication with the controller; and a pair of auxiliary fans positioned between the engine and the passenger cabin and attached to a belly pan of the vehicle, and in communication with the controller for drawing air away from the engine bay that has been heated by the engine, wherein the at least one sensor includes a velocity sensor that generates signals indicative of a velocity of the vehicle and a temperature sensor that generates signals indicative of a temperature of the air heated by the engine, wherein, upon determining that the HVAC system is operating in a cooling mode, the controller operates the pair of auxiliary fans to draw the air heated by the engine away from the engine bay and exterior to the vehicle to minimize the air heated by the engine from intermixing with the ambient air and being circulated through the condenser by the primary fan if the velocity sensor generates signals indicative of the velocity being below a predetermined velocity value, and if the temperature sensor generates signals indicative of the temperature being above a predetermined temperature value; and if the controller determines that operation of the pair of auxiliary fans is no longer necessary, the controller continues operation of the pair of auxiliary fans for a predetermined amount of time before ceasing operation of the pair of auxiliary fans.

2. The vehicle according to claim 1, wherein the predetermined velocity value is 10 miles per hour (mph).

3. The vehicle according to claim 1, wherein the predetermined temperature value is 35 degrees C.

4. The vehicle according to claim 1, wherein each auxiliary fan of the pair of auxiliary fans has a diameter that ranges between 4 to 7 inches.

5. A method for operating a vehicle heating, ventilation, and air conditioning (HVAC) system located in a vehicle engine bay having an engine, wherein the HVAC system includes a condenser, a primary fan positioned forward of the engine and the condenser for drawing air through the condenser, and a pair of auxiliary fans positioned aft of the engine and attached to a belly pan of the vehicle the method comprising:

determining whether the HVAC system is operating in a cooling mode;

determining whether the vehicle is traveling at a velocity below a predetermined velocity value;

after determining whether the vehicle is traveling at the velocity below the predetermined velocity value, determining whether a temperature of air in the engine bay is above a predetermined temperature value; and after determining that the temperature of the air in the engine bay is above the predetermined temperature value, operating the pair of auxiliary fans to draw the air in the engine bay at the temperature above the predetermined threshold away from the engine bay, away from the primary fan, and exterior to the vehicle; and after determining that operation of the pair of auxiliary fans is no longer necessary, continuing operation of the pair of auxiliary fans for a predetermined amount of time before ceasing operation of the pair of auxiliary fans.

6. The method according to claim 5, wherein the predetermined velocity value is 10 miles per hour (mph).

7. The method according to claim 5, wherein the predetermined temperature value is 35 degrees C.

8. The method according to claim 5, wherein each auxiliary fan of the pair of auxiliary fans has a diameter that ranges between 4 to 7 inches.

* * * * *